United States Patent
Gorday et al.

(10) Patent No.: US 6,665,521 B1
(45) Date of Patent: Dec. 16, 2003

(54) METHOD AND APPARATUS FOR COOPERATIVE DIVERSITY

(75) Inventors: Paul Edward Gorday, West Palm Beach, FL (US); Robert Mark Gorday, Wellington, FL (US); Salvador Sibecas, Lake Worth, FL (US)

(73) Assignee: Motorola, Inc., Schaumburg, IL (US)

(*) Notice: Subject to any disclaimer, the term of this patent is extended or adjusted under 35 U.S.C. 154(b) by 450 days.

(21) Appl. No.: 09/640,515

(22) Filed: Aug. 17, 2000

(51) Int. Cl.[7] .................... H04Q 7/20; H04Q 7/34; H04Q 7/38
(52) U.S. Cl. .............. 455/67.1; 455/518; 455/11.1; 455/445; 455/456; 340/7.2; 340/7.21; 340/7.24; 340/7.27; 370/315
(58) Field of Search .................. 455/518, 403, 455/422, 426, 432, 445, 456, 11.1, 500, 517, 550, 552, 67.1; 370/315; 340/7.2, 7.21, 7.24, 7.27

(56) References Cited

U.S. PATENT DOCUMENTS 5,771,463 A * 6/1998 Lehmusto et al. .......... 455/426
5,995,500 A * 11/1999 Ma et al. .................... 455/517
6,289,218 B1 * 9/2001 Liu .............................. 455/426

OTHER PUBLICATIONS

Michael P. Spratt, Message Passing To A Known Location, Jan. 24, 2002, US 2002/00009971 A1.*

* cited by examiner

Primary Examiner—William Trost
Assistant Examiner—Keith Ferguson
(74) Attorney, Agent, or Firm—Randi L. Dulaney; Daniel C. Crilly; Allison Dudley

(57) ABSTRACT

The wireless communication system (100) uses a method of improving diversity gain by utilizing a first network (10) operating with a first protocol and at least a second network (20) formed from a plurality of cooperative wireless devices (22, 24, 26, 28, and 29) operating with a second protocol and at least the first protocol. The method includes the step (302) of receiving a signal using the first protocol at one or more of the plurality of cooperative wireless devices intended for a targeted member of the plurality of cooperative wireless devices and the step (308) of processing the signal cooperatively among the plurality of cooperative wireless devices in order to increase diversity gain of the signal to the targeted member.

20 Claims, 4 Drawing Sheets

METHOD AND APPARATUS FOR COOPERATIVE DIVERSITY

FIELD OF THE INVENTION

The present invention is directed to communication networks, and more particularly to separate mobile networks that work cooperatively.

BACKGROUND OF THE INVENTION

In the near future, wireless communication devices (pagers, cell phones, etc.) will begin incorporating secondary wireless protocols (such as Bluetooth, HomeRF, IEEE 802.11, etc.) that operate at lower power and over shorter distances. These secondary protocols generally use unlicensed spectrum and require minimal coordination with the primary communication protocol of the device (e.g., GSM, IS-95, IS-136, ReFLEX, etc.).

Potential applications of these low-power, short-range, secondary protocols are wireless connection of peripherals devices, high-speed data transfers to desktop computers and wireline networks, and establishment of short-range "pico-nets" between similar wireless devices.

Current wireless communication networks are subject to problems including link reliability and coverage holes requiring repeated packet retransmissions. Thus, there is a need for a method and apparatus that combines the short-range pico-net capabilities of a secondary protocol with techniques that would allow a cooperative receive/transmit diversity benefit for the primary wireless protocol.

DETAILED DESCRIPTION

Researchers have focused much attention on diversity techniques in order to improve the link quality of current and future wireless communication systems. Multiple antennas and/or multiple receiver paths are micro-diversity techniques that can be used in the base station or mobile unit. Time diversity is a system technique that employs multiple transmissions between the base station and the mobile unit. Finally macro-diversity techniques combine signals received from a single mobile unit at multiple base stations sites.

Figure 1:
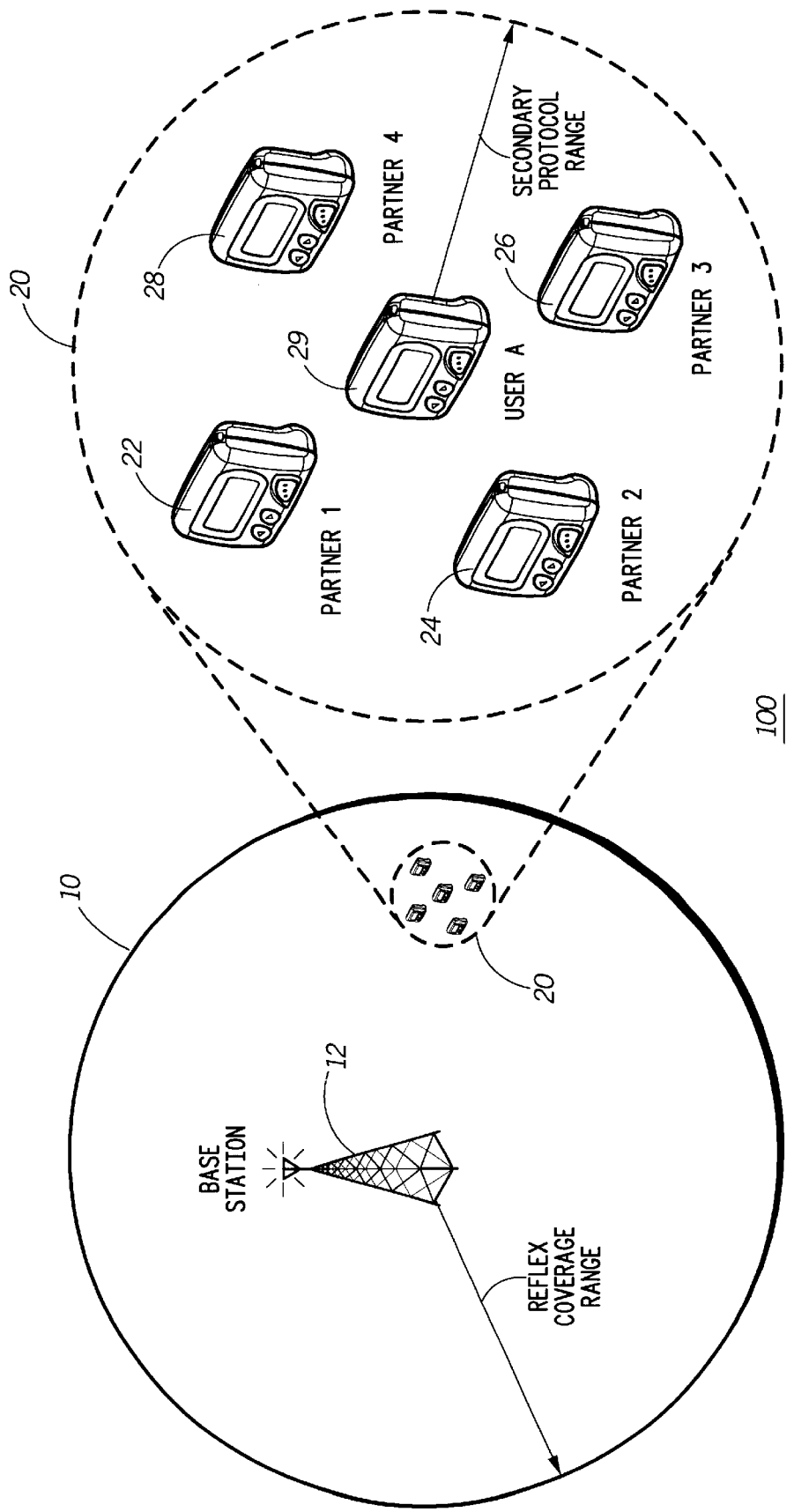
FIG. 1 is a block diagram of communication system having personal messaging units that operate on both a primary and secondary protocol in accordance with the present invention.

Referring to FIG. 1, the present invention discloses a new diversity technique based on the cooperation of a plurality of cooperative wireless devices within a short range 20 using a secondary protocol. For illustration, consider a specific wireless communication system 100 as shown in FIG. 1 having base station 12 with a co-located base transmitter and base receiver covering a wide area range 10 as shown using a primary protocol. A typical primary protocol could be Motorola's ReFLEX messaging protocol and preferably each of the wireless devices (22, 24, 26, 28 and 29) are ReFLEX units or wireless devices further using a secondary, short-range wireless protocol, such as Bluetooth (note that other protocols could be used). Using the secondary short-range protocol, each unit will establish a list of "partners", which are other ReFLEX units within range 20 of the secondary protocol.

In order to do this the secondary protocol must have provisions for scanning, or discovery, of other units within its range. Bluetooth, for example, has such a capability. In the example shown in FIG. 1, User A or wireless device 29 has discovered that there are four potential diversity partners within range of his secondary protocol.

Using the secondary protocol, wireless device 20 (User A) and one or more of the potential partners (22, 24, 26 or 28) agree to form a cooperative diversity network. This network is defined by a list of active partners stored in Unit A. Not all potential partners will be included on the list of active partners. For example the active list may be limited to only partners with the most reliable links on the primary protocol, or limited to partners with the most reliable links on the secondary protocol, or limited to some combination of these criteria. Also, some potential partners could be presently unable to support cooperative diversity for reasons including: primary transceiver disabled, limited processing or memory resources due to other activity, low battery level.

In general, each unit will initiate and form its own cooperative diversity network. These networks will exist simultaneously, and will likely overlap. For example, in FIG. 2, wireless devices 30, 32, and 34 are potential partners for wireless device 29, while wireless devices 29 and 40 are potential partners for User 30, etc.

Figure 2:
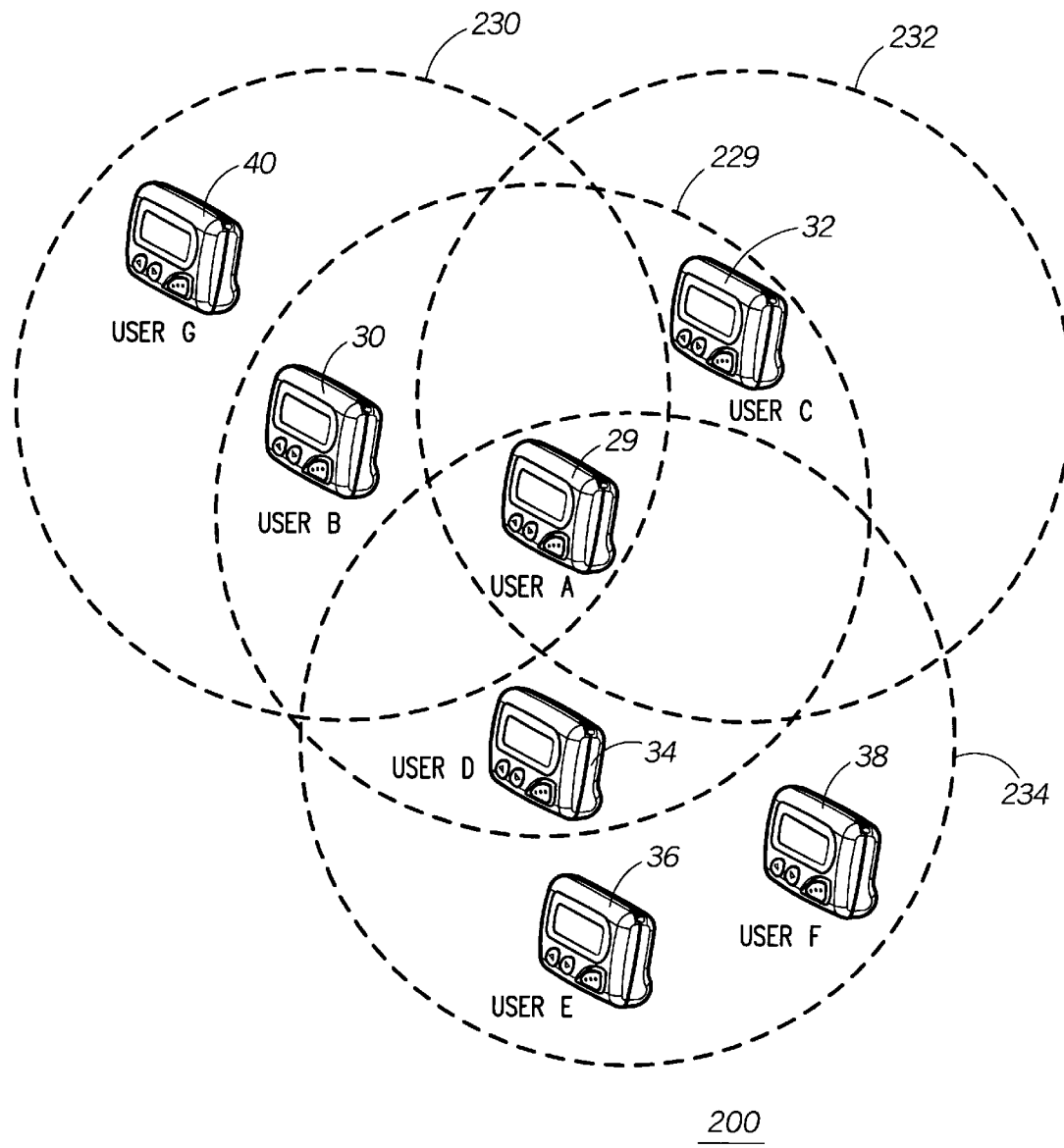
FIG. 2 is another block diagram of communication system having personal messaging units that operate on both a primary and secondary protocol shown with multiple overlapping cooperative diversity networks in accordance with the present invention.

In FIG. 2, it is conceivable that wireless device 29 could enlarge his cooperative network beyond the range of the secondary protocol by relaying messages through wireless devices 30, 32, and 34 to other members of their respective networks (thus including wireless devices 36, 38, and 40). The additional complexity of this would need to be weighed against any additional diversity gain.

Figure 3:
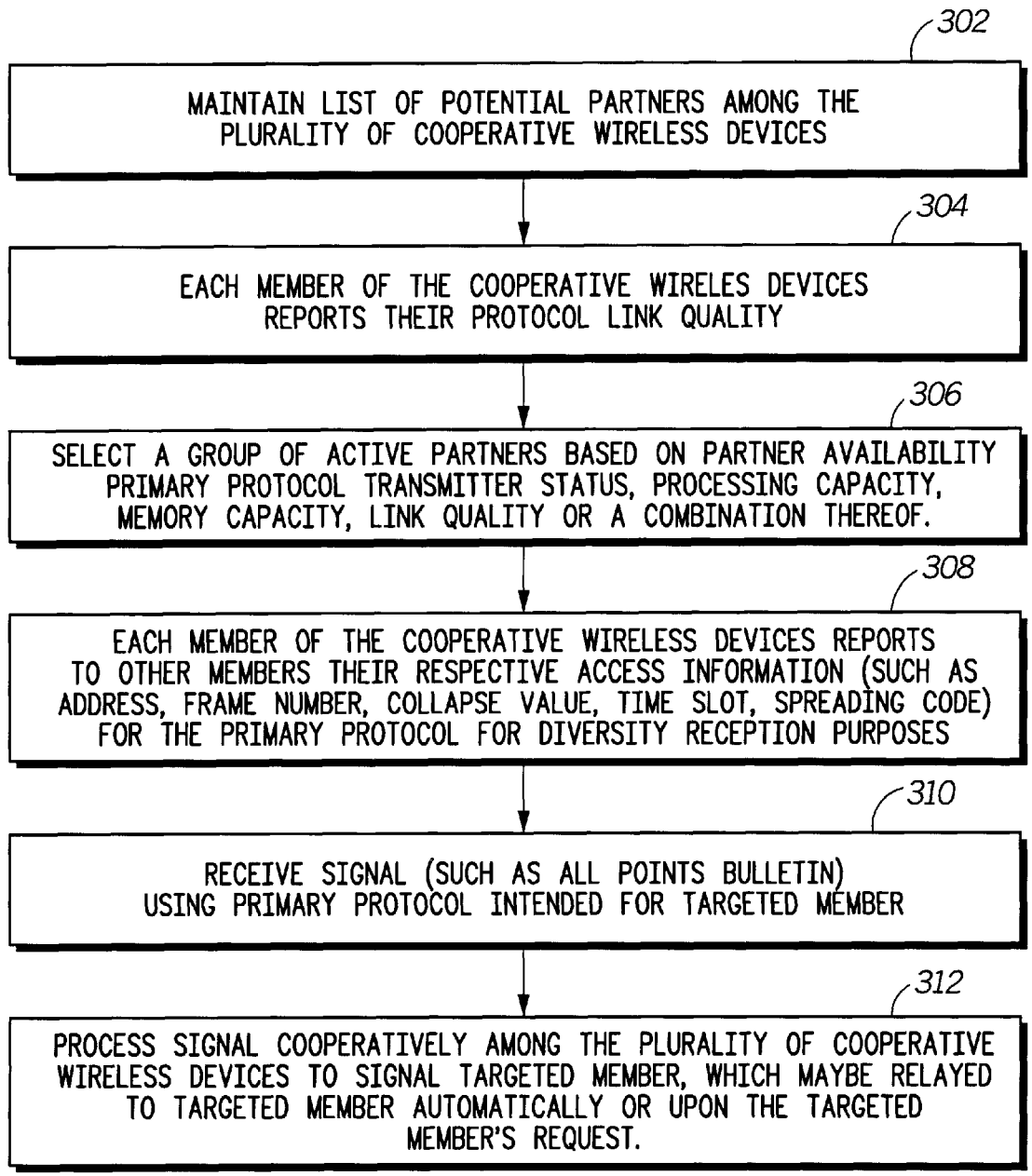
FIG. 3 is a flow chart of one embodiment of a method of improving diversity gain in a wireless communication system having at least a first network operating with a first protocol and at least a second network formed from a plurality of cooperative wireless devices operating with a second protocol and at least the first protocol in accordance with the present invention.

Referring to the flow chart of FIG. 3, in one embodiment, the present invention is illustrated by a method 300 of improving diversity gain in a wireless communication system having at least a first network operating with a first protocol and at least a second network formed from a plurality of cooperative wireless devices operating with a second protocol and at least the first protocol as shown in FIGS. 1 and 2. The method 300 preferably comprises the fundamental step 310 of receiving a signal using the first protocol at at least one of the plurality of cooperative wireless devices intended for a targeted member of the plurality of cooperative wireless devices and the step 312 of processing the signal cooperatively among the plurality of cooperative wireless devices in order to increase diversity gain of the signal to the targeted member. The processing could either automatically relay information extracted from the signal by the plurality of cooperative devices to the targeted member via the second protocol for diversity combining or relay the information upon a request of the targeted member. The step 312 of processing could also comprise the step 302 of maintaining a list of potential partners among the plurality of cooperative wireless devices that operate within the first network and within range of the second network. The step 312 could also further comprise the step 306 of selecting an active group of partners among the plurality of cooperative wireless devices based on criteria selected from the group consisting of partner availability, primary transceiver status, current processing capacity, current memory capacity, first protocol link quality, second protocol link quality, or a combination thereof. At step 304, the method could take the further step of having each member of the plurality of cooperative devices communicate their respective first protocol link quality and availability to a remaining group of the plurality of cooperative devices which is used to determine which members will participate in a diversity reception of information. At step 308, the method further comprises the step of having each member of the plurality of cooperative devices communicate their respective access information for the first protocol to enable diversity reception. Access information could be selected from the group of address, frame number, collapse value, time slot, channel frequency, or spreading code, much depending on the characteristics of the primary protocol.

As will be explained in further detail below, the signal sent by the wireless communication system can be an all points bulletin system message to locate the targeted member who has not responded to a registration request and wherein the step of processing further comprises the step at any of the cooperative wireless devices having an active connection with the targeted member using the second protocol of responding to the wireless communication system indicating that it has an active connection to the targeted member and await further instructions such as relaying a message to the targeted member. Alternatively, the signal sent by the wireless communication system could be an all points bulletin system message to locate the targeted member who has not responded to a registration request and wherein the step of processing further comprises the step at any of the cooperative wireless devices having an active connection with the targeted member using the second protocol of contacting the targeted member using the second protocol and informing it that the wireless communication system is looking for it and await further instructions from the targeted member such as relaying a response to the wireless communication system.

Figure 4:
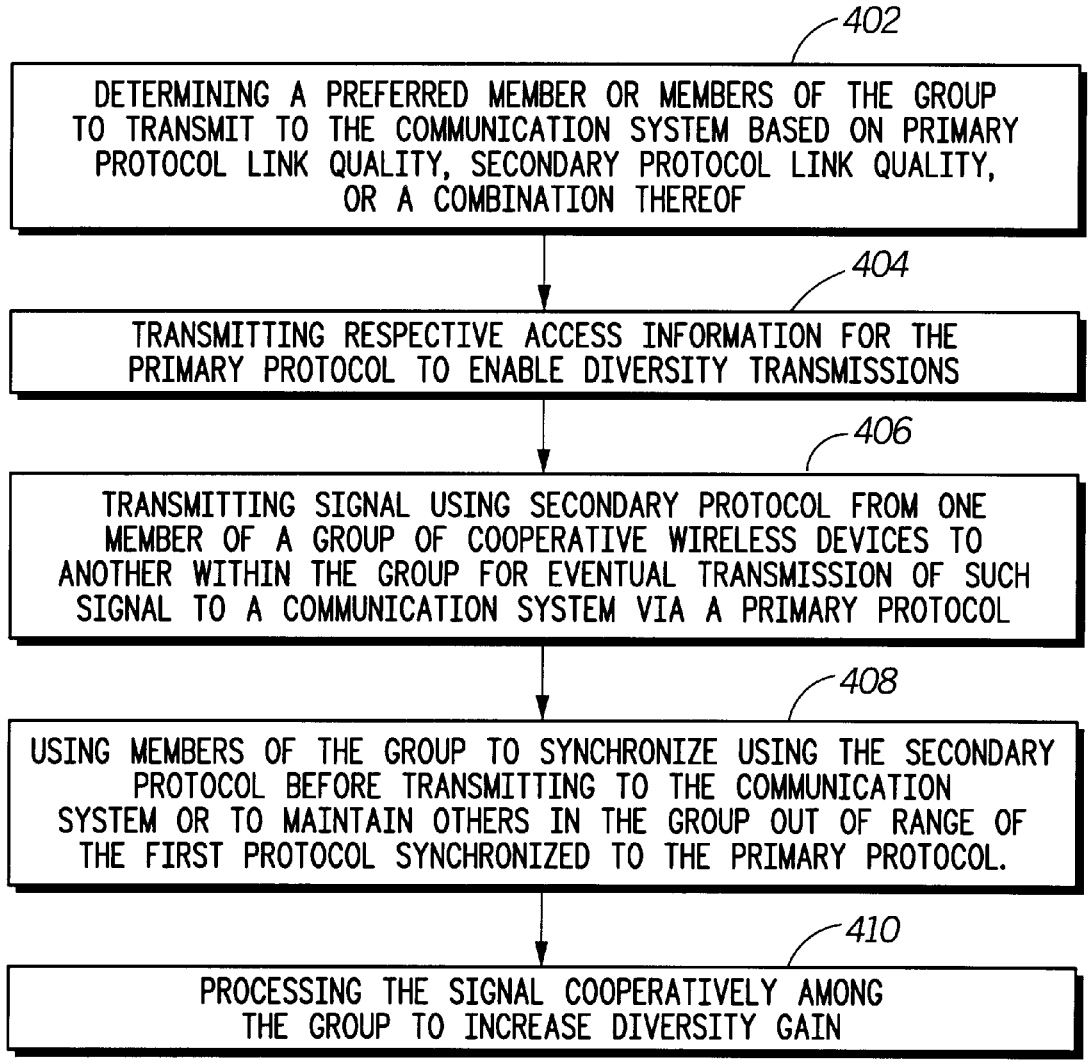
FIG. 4 is a flow chart of another embodiment of a method of improving diversity gain in a wireless communication system having at least a first network operating with a first protocol and at least a second network formed from a plurality of cooperative wireless device operating with a second protocol and at least the first protocol in accordance with the present invention.

Referring to the flow chart of FIG. 4, another embodiment of the present invention is illustrated by a method 400 of improving diversity gain in a wireless communication system having at least a first network operating with a first protocol and at least a second network formed from a plurality of cooperative wireless devices operating with a second protocol and at least the first protocol. The method 400 preferably includes the step 406 of transmitting a signal using the second protocol from one of the plurality of cooperative wireless devices to at least another one of the plurality of cooperative wireless devices, wherein such signal is intended for eventual transmission via the first protocol to the communication system and the step 410 of processing the signal cooperatively among the plurality of cooperative wireless devices in order to increase diversity gain of the signal transmitted to the communication system. The step of processing may further comprise the step 402 of determining a preferred member among the plurality of cooperative wireless devices which will transmit the signal to the communication system using the first signal. The preferred member is preferably determined by a link quality using the first protocol for each of the plurality of cooperative wireless devices or a link quality using the second protocol for each of the plurality of cooperative wireless devices or alternatively determined by using the link quality of the first protocol and/or second protocol for each of the plurality of cooperative wireless devices. It should be understood that the step of processing could further comprise the step of transmitting simultaneously the signal to the communication system by at least two or more of the plurality of cooperative wireless devices. The step of processing could further comprise the step 408 of using the second protocol by at least two or more of the plurality of cooperative wireless devices to provide a reference for synchronizing the devices prior to any simultaneous transmission by the devices to the communication system using the first protocol. This could also be useful to allow the plurality of cooperative wireless devices to exchange information concerning timing information related to the first protocol such that members of the plurality of cooperative wireless devices out of range of the first protocol can maintain synchronization on the first protocol. Finally, the processing step could further comprise the step 404 of having each member of the plurality of cooperative devices communicate their respective access information for the first protocol to enable diversity transmission wherein the access information would depend on the type of communication protocol used.

A diversity effect is obtained for the primary wide-area protocol when each member of a cooperative diversity network receives information (sent using the primary protocol) to any member of the network. In other words, using the example in FIG. 1, all information sent via the primary protocol to wireless device 29 would be received by wireless device 29 and by each of the active partners (22 through 28). The partners could then either automatically relay this information to wireless device 29, or wireless device 29 could request a copy of the information from any or all of the partners within a specified period of time. In either case, if wireless device 29 originally received corrupted information via the primary protocol, it could collect additional copies of the information from its partners via the secondary protocol, and subsequently combine the copies to create a more reliable version.

The diversity effect can also be obtained for transmission from the mobile unit. For example, wireless device 29 wishes to send a message to the primary protocol system, but he is currently in poor signal conditions. wireless device 29 can request that one or more of his partners transmits his message, either alone or together with him. Depending on the nature of the primary protocol, wireless device 29 along with one or more partners may synchronously transmit (simulcast) the message via the primary protocol. Or, wireless device 29 could find a partner whose primary protocol link quality is better than his, and then request that this partner transmit his message.

By voluntarily forming cooperative networks using the secondary protocol, the mobile units or wireless devices would improve the link reliability and minimize retransmission traffic on the primary protocol. Furthermore, as one of the examples explained shows, this invention extends the coverage of the primary protocol, filling in coverage holes and gaps that may otherwise not allow transmission or that would require fill-in base sites.

All of this can be achieved with little or no impact to the cost or complexity of the primary protocol system. In addition, it is expected that most wireless communication devices (pagers, cell phones, etc.) will soon include secondary, short-range protocols for other purposes, so no additional hardware will be needed in the mobile units. All that will be needed is some additional software (and potentially additional processing and memory capacity) in the mobile units to initiate and manage the cooperative network.

There are numerous examples where cooperative diversity networks would be useful. One is an office building environment, where a wireless device on the first floor has good signal strength (from the primary protocol), while a wireless device just beneath it in the basement has poor or marginal signal strength. The close proximity of the two units allows them to establish a link using the secondary protocol, and the basement unit will then benefit from the good primary protocol link of the unit on the first floor.

Another example is where several vehicles are traveling along a highway at similar speeds, and are in close enough proximity to permit establishment of a secondary protocol network. In sections of the highway where the primary protocol signal strength is marginal (and faded), these units can all provide diversity gains to each other to help improve reliability of the primary protocol. A similar example is a group of walking users moving down a city sidewalk.

This invention could lead to a new type of system message on the primary protocol. The message is similar to an "all points bulletin" used by law enforcement. First the primary protocol system (ReFLEX for example) would send out the registration request ("where are you") across the system coverage area in an attempt find a desired mobile unit. If no response is received, instead of assuming that the unit was off or out of range, the system would then send an "all points bulletin" (APB) message to all units in the system. If any mobile unit hears the APB and is currently an active partner with the desired unit in a cooperative diversity network, then either: (1) the active partner could respond to the system indicating that it was currently an active partner and await further instructions (such as relaying a message to the desired unit), or (2) the active partner could contact the desired unit via the secondary protocol, informing him that the system is currently looking for him. In the second case, if the desired unit had its primary protocol transceiver off, it could turn on the primary transceiver and respond to the system. Or if the desired unit was out of range of the primary protocol, it could use the secondary protocol to request that the partner relay a response to the primary protocol system.

The present invention in a preferred embodiment is unique in that the mobile receivers self-organize and create cooperative networks that change and adapt as the mobiles move around.

From a transmission perspective, the cooperative diversity looks either like simulcast (if all members of the cooperative network transmit the message) or like a cellular system (if the message originator selects the best partner to send his message). Again, however, the fact that this invention involves mobile units that self-organize and adapt over time makes it unique.

The above description is intended by way of example only and is not intended to limit the present invention in any way except as set forth in the following claims.

What is claimed is:

1. A method of providing diversity gain in a wireless communication system having at least a first network operating with a first protocol and at least a second network formed from a plurality of cooperative wireless devices operating with a second protocol and at least the first protocol, comprising the steps of:

receiving a signal using the first protocol at one or more of the plurality of cooperative wireless devices intended for a targeted member of the plurality of cooperative wireless devices; and processing the signal cooperatively among the plurality of cooperative wireless devices in order to provide diversity gain of the signal to the targeted member.

2. The method of claim 1, wherein the step of processing the signal cooperatively comprises the step of maintaining a list of potential partners among the plurality of cooperative wireless devices that operate within the first network and within range of the second network.

3. The method of claim 2, wherein the step of processing further comprises the step of selecting an active group of partners among the plurality of cooperative wireless devices based on criteria selected from the group consisting of partner availability, primary transceiver status, current processing capacity, current memory capacity, first protocol link quality, second protocol link quality, or a combination thereof.

4. The method of claim 1, wherein the processing step further comprises the step of receiving the signal intended for the targeted member by the plurality of cooperative wireless devices and then automatically relaying information extracted from the signal by the plurality of cooperative devices to the targeted member via the second protocol for diversity combining.

5. The method of claim 1, wherein the processing step further comprises the step of receiving the signal intended for the targeted member by the plurality of cooperative wireless devices and then relaying information extracted from the signal by the plurality of cooperative devices to the targeted member via the second protocol for diversity combining at the request of the targeted member.

6. The method of claim 1, wherein the method further comprises the step of having each member of the plurality of cooperative devices use the second protocol to communicate their respective first protocol link quality and availability to a remaining group of the plurality of cooperative devices which is used to determine which members will participate in a diversity reception of information.

7. The method of claim 1, wherein the method further comprises the step of having each member of the plurality of cooperative devices use the second protocol to communicate their respective access information for the first protocol to enable diversity reception.

8. The method of claim 7, wherein the respective access information is selected from the group consisting of address, frame number, collapse value, time slot, channel frequency, or spreading code.

9. The method of claim 1, wherein the signal sent by the wireless communication system is an all points bulletin system message to locate the targeted member who has not responded to a registration request and wherein the step of processing further comprises the step at any of the cooperative wireless devices having an active connection with the targeted member using the second protocol of responding to the wireless communication system using the first protocol and indicating that it has an active connection to the targeted member and await further instructions such as relaying a message to the targeted member.

10. The method of claim 1, wherein the signal sent by the wireless communication system is an all points bulletin system message to locate the targeted member who has not responded to a registration request and wherein the step of processing further comprises the step at any of the cooperative wireless devices having an active connection with the targeted member using the second protocol of contacting the targeted member using the second protocol and informing it that the wireless communication system is looking for it and await further instructions from the targeted member such as relaying a response to the wireless communication system.

11. A method of providing diversity gain in a wireless communication system having at least a first network operating with a first protocol and at least a second network formed from a plurality of cooperative wireless devices operating with a second protocol and at least the first protocol, comprising the steps of:

transmitting a signal using the second protocol from one of the plurality of cooperative wireless devices to at least another one of the plurality of cooperative wireless devices, wherein such signal is intended for eventual transmission via the first protocol to the wireless communication system; and processing the signal cooperatively among the plurality of cooperative wireless devices in order to provide diversity gain of the signal transmitted to the wireless communication system.

12. The method of claim 11, wherein the step of processing further comprises the step of determining a preferred member among the plurality of cooperative wireless devices which will transmit the signal to the wireless communication system using the first protocol.

13. The method of claim 12, wherein the preferred member is determined by a link quality using the first protocol for each of the plurality of cooperative wireless devices.

14. The method of claim 12, wherein the preferred member is determined by a link quality using the second protocol for each of the plurality of cooperative wireless devices.

15. The method of claim 12, wherein the preferred member is determined by a link quality using the first protocol and/or second protocol for each of the plurality of cooperative wireless devices.

16. The method of claim 11, wherein the step of processing further comprises the step of transmitting simultaneously the signal to, the wireless communication system by at least two or more of the plurality of cooperative wireless devices.

17. The method of claim 11, wherein the step of processing further comprises the step of using the second protocol by at least two or more of the plurality of cooperative wireless devices to provide a reference for synchronizing the devices prior to any simultaneous transmission by the devices to the wireless communication system using the first protocol.

18. The method of claim 11, wherein the step of processing further comprises the step of using the second protocol by at least two or more of the plurality of cooperative wireless devices to exchange information concerning timing information related to the first protocol such that members of the plurality of cooperative wireless devices out of range of the first protocol can maintain synchronization on the first protocol.

19. The method of claim 11, wherein the step of processing further comprises the step of having each member of the plurality of cooperative devices communicate their respective access information for the first protocol to enable diversity transmission.

20. The method of claim 11, wherein the plurality of cooperative wireless devices on the second network are self-organizing.

* * * * *